US010363981B2

United States Patent
Ingram

(10) Patent No.: US 10,363,981 B2
(45) Date of Patent: Jul. 30, 2019

(54) HEAT-REFLECTING AND WARMING SEAT COVER

(71) Applicant: Harold R. Ingram, Detroit, MI (US)

(72) Inventor: Harold R. Ingram, Detroit, MI (US)

( * ) Notice: Subject to any disclaimer, the term of this patent is extended or adjusted under 35 U.S.C. 154(b) by 0 days.

(21) Appl. No.: 15/953,076

(22) Filed: Apr. 13, 2018

(65) Prior Publication Data

US 2018/0304949 A1 Oct. 25, 2018

Related U.S. Application Data

(60) Provisional application No. 62/487,661, filed on Apr. 20, 2017.

(51) Int. Cl.
| | | |
|---|---|---|
| *B60N 2/56* | (2006.01) | |
| *B60N 2/58* | (2006.01) | |
| *B60N 2/60* | (2006.01) | |
| *B62J 1/20* | (2006.01) | |
| *B62J 1/28* | (2006.01) | |
| *B62J 33/00* | (2006.01) | |

(52) U.S. Cl.
CPC ............... *B62J 1/20* (2013.01); *B60N 2/56* (2013.01); *B60N 2/5685* (2013.01); *B60N 2/58* (2013.01); *B62J 1/28* (2013.01); *B62J 33/00* (2013.01)

(58) Field of Classification Search
CPC ..... B62J 1/20; B62J 1/28; B62J 33/00; B60N 2/56; B60N 2/5685; B60N 2/58
USPC ............................ 297/180.11, 228.11, 219.11
See application file for complete search history.

(56) References Cited

U.S. PATENT DOCUMENTS

| | | | | | |
|---|---|---|---|---|---|
| 4,868,898 | A | * | 9/1989 | Seto | A47C 7/748 219/528 |
| 5,080,431 | A | | 1/1992 | Frazier | |
| 5,320,407 | A | * | 6/1994 | Tell | A47C 31/11 297/228.11 X |
| 5,338,092 | A | * | 8/1994 | Wiltsey | A47C 31/11 297/228.11 X |
| 5,339,748 | A | * | 8/1994 | Bilotti | A47G 11/004 297/228.11 X |
| 5,474,329 | A | * | 12/1995 | Wade | B60R 21/06 297/228.11 X |
| 5,529,373 | A | * | 6/1996 | Olson | A47C 31/02 297/228.11 X |
| 5,545,198 | A | * | 8/1996 | Owens | A61F 7/02 607/108 |
| 5,700,284 | A | * | 12/1997 | Owens | A61F 7/02 607/112 |
| 5,716,096 | A | * | 2/1998 | Pryde | B60N 2/609 297/228.11 X |
| 5,768,758 | A | * | 6/1998 | Deignan | A47C 31/02 297/228.11 X |
| 5,806,925 | A | * | 9/1998 | Hanley | A47C 31/113 297/228.11 X |
| 6,007,149 | A | * | 12/1999 | Yates | B62J 1/00 297/228.11 X |

(Continued)

*Primary Examiner* — Rodney B White
(74) *Attorney, Agent, or Firm* — Global Intellectual Property Agency, LLC; Daniel Boudwin

(57) ABSTRACT

A seat cover that generates heat, reflects the sun and repels water. The seat cover includes an interior side, an exterior side, and an open lower end. The open lower end can secure around a motorcycle seat and the exterior side can reflect heat and repel water. The open lower end further includes heating strips embedded in the interior side of the seat cover, which increases or decreases the temperature of the seat cover when activated by a heat control unit. The open lower end further includes a lip on the seat cover having a fastener for securing the seat cover over the seat of the motorcycle.

19 Claims, 3 Drawing Sheets

(56) References Cited

U.S. PATENT DOCUMENTS

| | | | | |
|---|---|---|---|---|
| 6,007,572 | A * | 12/1999 | Baldwin | A61F 7/02 |
| | | | | 297/380 |
| 6,073,998 | A * | 6/2000 | Siarkowski | A47C 7/748 |
| | | | | 297/180.11 X |
| 6,516,844 | B1 | 2/2003 | Henry | |
| 6,848,746 | B2 * | 2/2005 | Gentry | A47C 7/748 |
| | | | | 297/180.11 |
| 7,152,412 | B2 * | 12/2006 | Harvie | A41D 13/0051 |
| | | | | 62/3.5 |
| 7,178,866 | B1 | 2/2007 | Scott | |
| 7,416,250 | B1 * | 8/2008 | DiFilippo | B62J 1/12 |
| | | | | 297/228.11 X |
| 7,556,292 | B2 * | 7/2009 | King | B62J 17/06 |
| | | | | 297/219.11 X |
| 8,556,337 | B1 * | 10/2013 | Cornitius-Cary | A47C 7/021 |
| | | | | 297/180.11 X |
| 8,936,313 | B2 * | 1/2015 | Skarvan | B62J 1/20 |
| | | | | 297/219.11 |
| 2005/0046249 | A1 | 3/2005 | Crumley et al. | |
| 2005/0110314 | A1 * | 5/2005 | Buselmeier | B62J 1/20 |
| | | | | 297/219.11 |
| 2006/0279113 | A1 | 12/2006 | Pautz | |
| 2007/0200401 | A1 * | 8/2007 | Eberlein | A47C 1/03 |
| | | | | 297/228.11 X |
| 2010/0176633 | A1 * | 7/2010 | Brncick | B60N 2/5816 |
| | | | | 297/228.11 |
| 2012/0193958 | A1 * | 8/2012 | DePasquale | A47C 31/11 |
| | | | | 297/228.11 |
| 2013/0088054 | A1 * | 4/2013 | Atchison | B60N 2/6063 |
| | | | | 297/228.11 X |
| 2015/0137566 | A1 * | 5/2015 | Wagner | A47C 7/021 |
| | | | | 297/180.11 X |

* cited by examiner

HEAT-REFLECTING AND WARMING SEAT COVER

CROSS REFERENCE TO RELATED APPLICATIONS

This application claims the benefit of U.S. Provisional Application No. 62/487,661 filed on Apr. 20, 2017. The above identified patent application is herein incorporated by reference in its entirety to provide continuity of disclosure.

BACKGROUND OF THE INVENTION

The present invention relates to seat covers, specifically, to a sun reflecting and heat generating, waterproof motorcycle seat cover which prevents the seat cover from absorbing water and remaining wet for prolonged periods of time; a sun-reflecting component which prevents the seat cover from overheating while sitting in the sun; and a heat-generating component which provides warmth to the vehicle operator.

Many motorcyclists do not enjoy using a motorcycle seat that has absorbed water, nor do they enjoy using one that is cold to the touch, or hot to the touch. Once exposed to water, the seat may absorb the water and remain wet for prolonged periods of time. Additionally, some seats become very hot when left parked in direct sunlight. Motorcycle seats can also be cold after being parked outside over night or in the winter. It is generally preferred to have a temperature controlled dry seat.

It is therefore the intention of the present invention to provide a waterproof motorcycle seat cover which reflects sunlight and generates heat to provide comfort to the vehicle operator.

Devices have been disclosed in the known art that relate to seat covers. These include devices that have been patented and published in patent application publications. These devices, however, fail to disclose a seat cover having a plurality of heating strips and a reflective outer layer.

In view of the devices disclosed in the known art, it is submitted that the present invention substantially diverges in design elements from the known art and consequently it is clear that there is a need in the art for an improvement to existing lid holding devices. In this regard the instant invention substantially fulfills these needs.

SUMMARY OF THE INVENTION

In view of the foregoing disadvantages inherent in the known types of motorcycle seat covers now present in the art, the present invention provides a motorcycle seat cover wherein the same can be utilized for providing convenience for the user when driving a motorcycle. The present system comprises a sun reflecting and heat generating, waterproof motorcycle seat cover which prevents the seat cover from absorbing water and remaining wet for prolonged periods of time; a sun-reflecting component which prevents the seat cover from overheating while sitting in the sun; and a heat-generating component which provides warmth to the vehicle operator.

BRIEF DESCRIPTION OF THE DRAWINGS

Although the characteristic features of this invention will be particularly pointed out in the claims, the invention itself and manner, in which it may be made and used may be better understood after a review of the following description, taken in connection with the accompanying drawings wherein like numeral annotations are provided throughout.

DETAILED DESCRIPTION OF THE INVENTION

Figure 1:
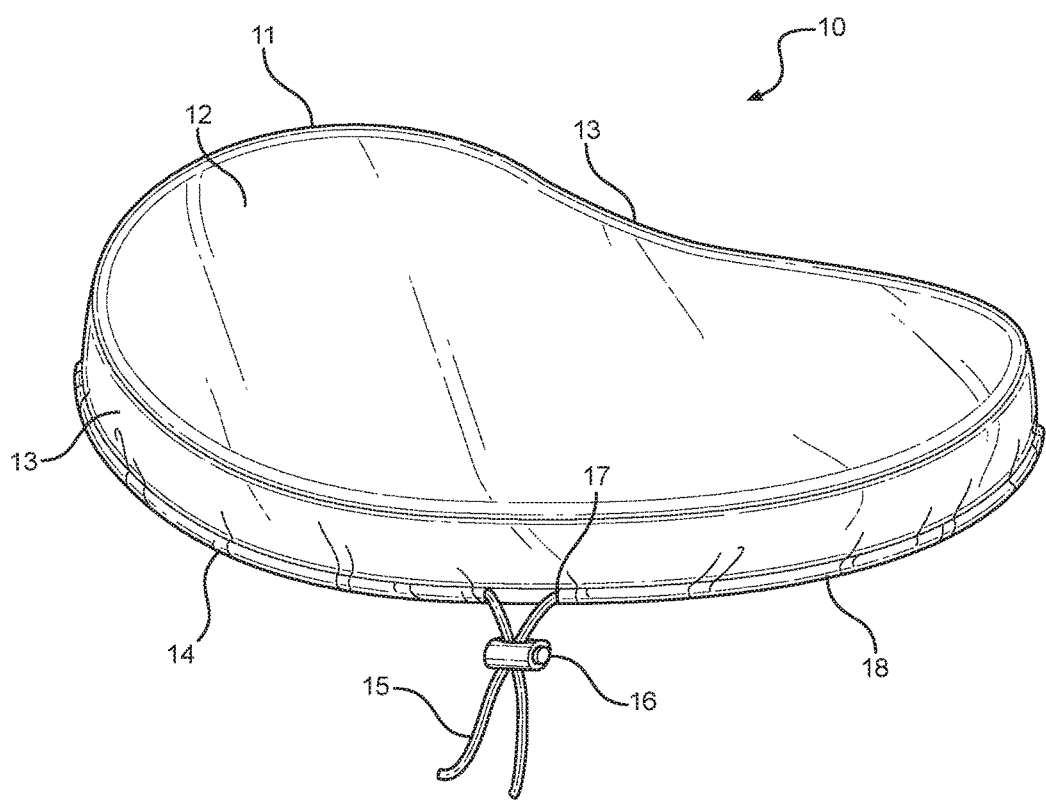
FIG. 1 shows a perspective view of an embodiment of the seat cover.

Reference is made herein to the attached drawings. Like reference numerals are used throughout the drawings to depict like or similar elements of the seat cover. The figures are intended for representative purposes only and should not be considered limiting in any respect.

The present invention discloses a heated seat cover that is equipped with a sun-reflecting exterior, waterproof fabric, and embedded heating elements such that the heating function of the seat can be turned on-off or low-high by the vehicle operator.

Referring now to FIG. 1, there is shown a perspective view of an embodiment of the seat cover. The seat cover 11 provides a device that attaches to a seat that allows a user to selectively control a temperature thereof. The seat cover 11 comprises a body 11 having a lip 13 extending from a perimeter of an exterior side 12 forming an open lower end 14, wherein the open lower end 14 is configured to receive a seat therein. In the illustrated embodiment, the body 11 has an oval shape that is sized to cover the entire or a portion of the seat.

The exterior side 12 includes reflective material configured to reflect heat. In one embodiment, the reflective material is embedded within a fabric of the exterior side 12. In alternative embodiments, the exterior side 12 is composed of reflective material. The reflective material prevents the seat cover 11 from exceeding a high temperature that would cause discomfort to a user seated thereon.

Figure 2:
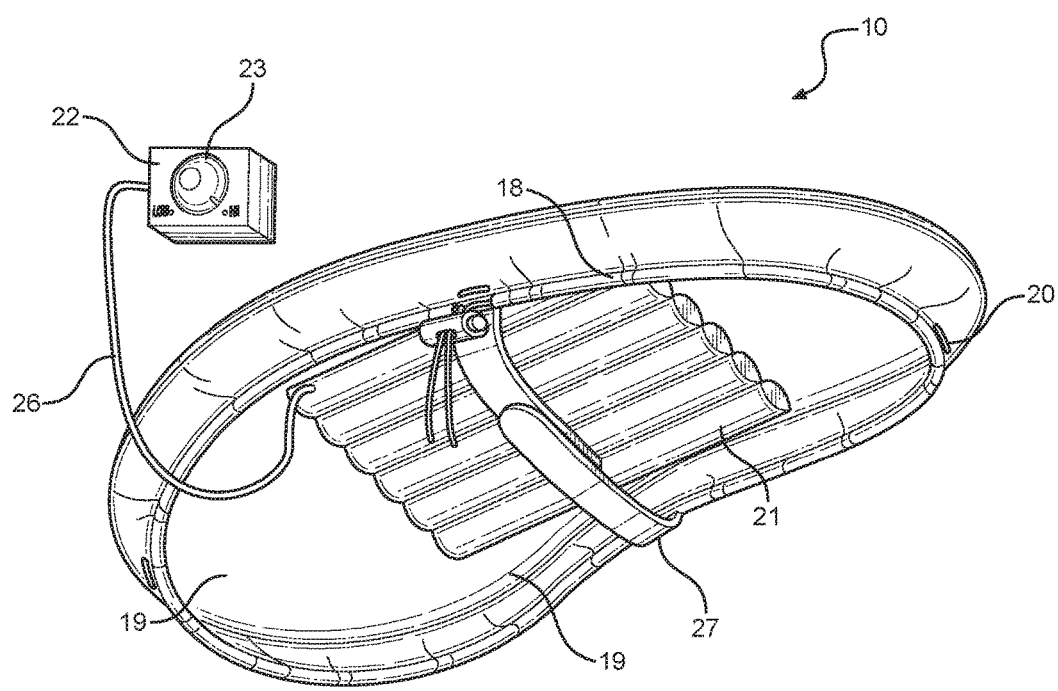
FIG. 2 shows a bottom perspective view of an embodiment of the seat cover.

A diameter of the lip 13 of the seat cover 10 is adjustable in size in order to maintain the seat cover 11 in a secured configuration over the seat. In the shown embodiment, a fastener 15 is disposed on the lip 13 and extends through an opening 17 of a channel 18 that extends around a perimeter of the seat cover 11. The fastener 15, in cooperative relationship with a closure 16, is configured to selectively adjust a diameter of the open lower end so as to removably secure the seat cover 11 to the seat. As shown in FIGS. 1 and 2, the fastener is an elastic band and the closure 16 is positioned adjacent the opening 17 of the channel 18, wherein the opening 17 provides access to the channel 18 from an exterior of the body. The closure 16 provides a biased clamp that is configured to selectively adjust a tension of the elastic band so as to secure the seat cover to the seat.

Referring now to FIG. 2, there is shown a bottom perspective view of an embodiment of the seat cover. In the illustrated embodiment, a strap 27 extends from a first side of the lip, wherein the strap 27 includes a fastener thereon. The strap 27 is configured to further secure the seat cover 11 to the motorcycle seat. In the illustrated embodiment, the strap 27 is comprised of two straps removably connectable to one another towards the center of the interior side of the seat cover 11 by hook and loop material. The illustrated embodiment also shows the channel 18 and the elastic band fastener 15 disposed around a lower edge of the lip 13.

The seat cover further comprises a heating element configured to heat the body of the seat cover. In the illustrated embodiment, the heating element is a heating strip 21 affixed to the interior side of the seat cover 11 configured to transfer heat throughout the entire seat cover 11 when activated by a heat control unit 17. The heating strip 21 is positioned centrally on the interior side 19 forming a gap 30 extending around the heating strip 21 and the lip 18. The gap 30 provides a tolerance to allow the seat cover 11 to be affixed to seats having various dimensions.

Figure 3:
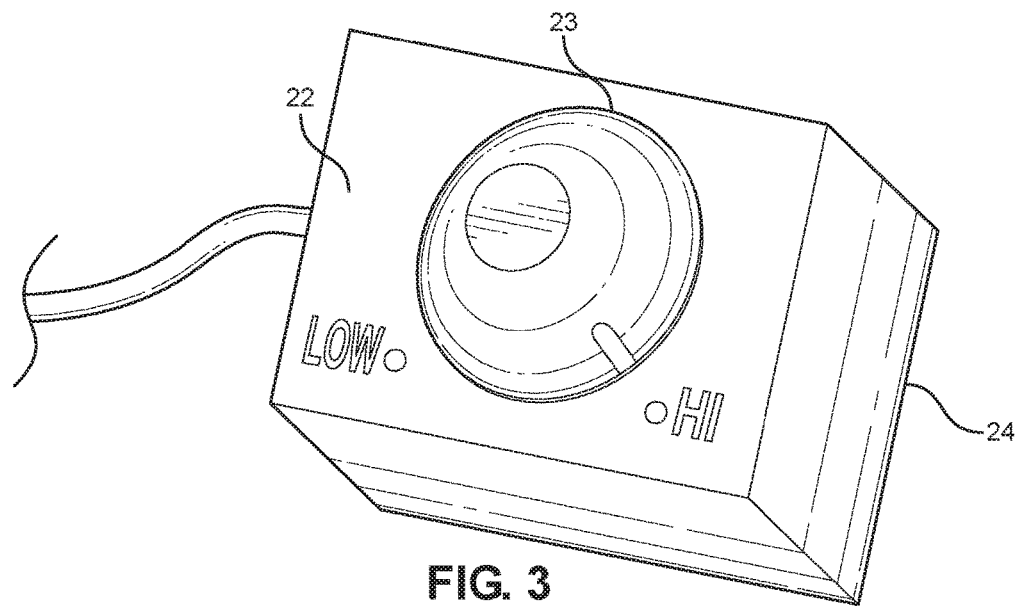
FIG. 3 shows a perspective view of the heat control unit of the seat cover.
Figure 4:
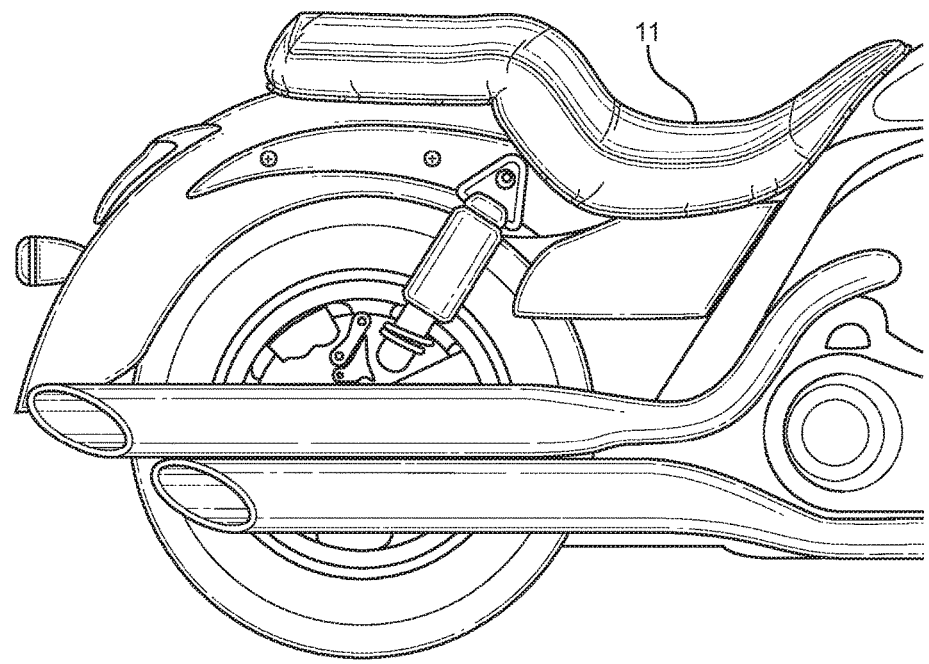
FIG. 4 shows a side view of an embodiment of the seat cover secured to a seat of a motorcycle.

Referring now to FIGS. 1 and 3, there is shown a perspective view of the heat control unit. The heat control unit 22 comprises a housing configured to house a power supply, such as batteries, wherein the power supply is operably connected to the heating elements 21. A control switch 23 of the heat control unit 22 provides for selectively increasing and decreasing heat output of the plurality of heating elements 21.

In the illustrated embodiment, the heat control unit 22 includes wiring 26 for communicating between the heat control unit 22 and the plurality of heating strips 21. In one embodiment, the heat control unit 22 is in wireless communication with the heating elements 21 via a pair of transceivers. In this way, the heat control unit 22 may be positioned on a motorcycle handle.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A seat cover, comprising:
   a body having a lip extending from a perimeter of an exterior side of the body, thereby forming an open lower end, wherein the open lower end is configured to receive a seat therein;
   wherein the exterior side comprises a reflective material configured to reflect heat;
   a heating element attached to an interior side of the seat cover, wherein the heating element is configured to increase a temperature of the exterior side and comprises a heating strip that extends between a front end and a rear end of the body;
   wherein the lip is adjustable for maintaining the seat cover in a secured configuration over the seat;
   a fastener disposed on the lip, the fastener configured to removably secure the seat cover to the seat; and
   a battery-operated casing attached to an internal power source.

2. The seat cover of claim 1, wherein the fastener comprises an elastic band disposed through a channel of the lip, the elastic band configured to selectively adjust a diameter of the open lower end, wherein the elastic band is biased toward a retracted configuration to bear against the seat received within the open lower end.

3. The seat cover of claim 2, further comprising a drawstring closure operably connected to an end of the elastic band, the drawstring closure positioned adjacent an opening of the channel, the opening providing access to the channel from an exterior of the body, wherein the drawstring closure is configured to selectively adjust a tension of the elastic band so as to secure the seat cover to the seat.

4. The seat cover of claim 3, wherein the opening of the channel includes at least three openings each disposed on different ends of the body.

5. The seat cover of claim 1, further comprising a strap extending from a first side of the lip having a fastener thereon, the strap configured to secure the heating element to the seat cover.

6. The seat cover of claim 1, further comprising a heat control unit operably connected to the heating element, configured to control actuation of the heating element upon selective actuation of a switch.

7. The seat cover of claim 6, wherein the heat control unit further comprises a power connector that connects the heating element to an external power source.

8. The seat cover of claim 7, wherein the heat control unit is configured to be secured to a handlebar of a motorcycle with the seat thereon.

9. The seat cover of claim 1, wherein the reflective material is comprised of an organic fiber in the aromatic polyamide family that provides a combination of high strength, high modulus, toughness and thermal stability.

10. The seat cover of claim 1, wherein the body comprises waterproof fabric made of organic fiber in the aromatic polyamide family.

11. A seat cover, comprising:
    a body having a lip extending from a perimeter of an exterior side of the body, thereby forming an open lower end, wherein the open lower end is configured to receive a seat therein;
    wherein the exterior side comprises a reflective material configured to reflect heat;
    a heating element attached to an interior side of the seat cover, wherein the heating element is configured to increase a temperature of the exterior side and comprises a heating strip that extends between a front end and a rear end of the body;
    wherein the lip is adjustable for maintaining the seat cover in a secured configuration over the seat;
    a fastener disposed on the lip, the fastener configured to removably secure the seat cover to the seat;
    a battery-operated casing attached to an internal power source; and
    a heat control unit operably connected to the heating element, configured to control actuation of the heating element upon selective actuation of a switch.

12. The seat cover of claim 11, wherein the heat control unit further comprises a power connector that connects the heating element to an external power source.

13. The seat cover of claim 12, wherein the heat control unit is configured to be secured to a handlebar of a motorcycle with the seat thereon.

14. The seat cover of claim 11, wherein the fastener comprises an elastic band disposed through a channel of the lip, the elastic band configured to selectively adjust a diameter of the open lower end, wherein the elastic band is biased toward a retracted configuration to bear against the seat received within the open lower end.

15. The seat cover of claim 14, further comprising a drawstring closure operably connected to an end of the elastic band, the drawstring closure positioned adjacent an opening of the channel, the opening providing access to the channel from an exterior of the body, wherein the drawstring closure is configured to selectively adjust a tension of the elastic band so as to secure the seat cover to the seat.

16. The seat cover of claim 15, wherein the opening of the channel includes at least three openings each disposed on different ends of the body.

17. The seat cover of claim 11, further comprising a strap extending from a first side of the lip having a fastener thereon, the strap configured to secure the heating element to the seat cover.

18. The seat cover of claim 11, wherein the reflective material is comprised of an organic fiber in the aromatic polyamide family that provides a combination of high strength, high modulus, toughness and thermal stability.

19. The seat cover of claim 11, wherein the body comprises waterproof fabric made of organic fiber in the aromatic polyamide family.

\* \* \* \* \*